SANDWICHED MAGNETIC MEMORY ELEMENT

Filed Feb. 27, 1967 2 Sheets-Sheet 1

INVENTORS
WILLIAM W. DAVIS
EDWARD L. KRIEGER
BY Thomas J. Nikolai
ATTORNEY

INVENTORS
WILLIAM W. DAVIS
EDWARD L. KRIEGER
BY Thomas J. Nikolai
ATTORNEY

3,500,357
SANDWICHED MAGNETIC MEMORY ELEMENT

Edward L. Krieger, St. Paul, and William W. Davis, Minneapolis, Minn., assignors to Sperry Rand Corporation, New York, N.Y., a corporation of Delaware

Filed Feb. 27, 1967, Ser. No. 618,838
Int. Cl. G11b *5/00*
U.S. Cl. 340—174 7 Claims

ABSTRACT OF THE DISCLOSURE

A nondestructive readout memory element comprising two superposed, closed-flux-path, thick-ferromagnetic-films sandwiching a word line of the same general form having input and output leads. An energized sense-bit line threading the central aperture sets the magnetization of the films in a first or a second and opposite polarity around the closed-flux-path corresponding to the polarity of the applied current signal. The energized word line effects the magnetization of the films inducing a bi-polar output signal in the sense-bit line, the polarity phase of which is indicative of the polarity of the films' magnetization.

BACKGROUND OF THE INVENTION

Ordinary magnetizable cores and their associated circuits utilized as memory elements in electronic data processing equipment are now so well known they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which insures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of magnetic saturation, i.e., positive saturation denoting a "1" to the other magnetic state corresponding to the opposite direction of magnetic saturation, i.e., negative saturation, denoting a binary "0." One or more output coils are usually provided to sense when the core's magnetization is switched from one state of saturation to the other. Switching of the magnetization of such cores is usually achieved by passing a current pulse of sufficient amplitude through the input winding in a manner so as to set up a magnetic field in the area of the magnetizable core in a sense that is opposite to the pre-existing flux direction thereby driving the core's magnetization into the opposite sense, or polarity, i.e., of positive to negative magnetic saturation. When the core switches, the resulting magnetic flux linkage variation induces a signal in the windings on the core such as, for example, the above mentioned output, or sense winding. Material for the core may be of various magnetizable materials.

One technique of achieving destructive readout of a toroidal bistable memory core is that of the well known coincident current technique. This method utilizes the threshold characteristic of a core having a substantially rectangular hysteresis characteristic. In this technique a minimum of two interrogate lines thread the core's central aperture, each interrogate line setting up a magnetomotive force in the memory core of one half the magnetomotive force necessary to completely switch the magnetization of the memory core from a first to a second and opposite magnetic state while the magnetomotive force set up by each separate interrogate winding is of insufficient magnitude to effect a substantial change in the memory core's magnetization. A sense winding threads the core's central aperture and detects the memory core's substantial or insubstantial magnetic flux change as an indication of the information stored therein.

A technique of achieving the destructive reading and writing of a thin-ferromagnetic-film having the property of unaxial anisotropy, namely an easy axis along which the magnetization of the film is established in a first or a second and opposite direction, involves the use of coincident orthogonal fields applied in the plane of the film layer. This technique achieves a single-domain-rotational switching of the film's magnetization and is more fully taught in the S. M. Rubens et al. Patent No. 3,030,612. In this technique a transverse field of $H_t$ is initially applied to the film in the plane thereof perpendicular to the film's easy axis. This transverse drive field rotates the magnetization of the film away from the easy axis a number of degrees as determined by the intensity of such transverse drive field. Subsequently, but coincident therewith, there is applied a longitudinal drive field $H_l$ in the plane of the film and in a first or second and opposite direction along the film's easy axis. The combination of the transverse and longitudinal drive fields rotates the magnetization of the film away from the film's easy axis such that when the longitudinal drive field is removed the film's magnetization aligns itself along the film's easy axis in a polarity that is determined by the polarity of the applied longitudinal drive field. Additionally, by a proper control of the intensity of the drive fields, such as using a transverse drive field alone of the proper intensity, the magnetization of the film may be caused to rotate away from the film's easy axis but not beyond its irreversible limit. Upon the release of such a transverse drive field the magnetization of the film returns to its original condition. This combination of longitudinal and transverse drive fields is utilized in the present invention to set the magnetization of the toroidal, thick-ferromagnetic-films in a first or second and opposite direction around the toroidal films' closed-flux-paths and the transverse drive field alone is utilized to achieve nondestructive readout of the informational state of the thick-ferromagnetic-films.

SUMMARY OF THE INVENTION

The present invention is directed toward two superposed closed-flux-path thick-ferromagnetic-film elements sandwiching therebetween a copper word line of the same general planar configuration which copper word line has radially opposing input and output leads. The word line when properly energized by a current signal of the desired characteristic establishes essentially a radial field in the two superposed film elements which, with respect to the closed-flux-paths thereof, may be considered to constitute a transverse drive field $H_t$ with respect to the magnetization thereof. Additionally, there is provided a common bit-sense line that threads the central apertures of the superposed layers of the two thick-ferromagnetic-film elements and the sandwiched copper word line. The bit-sense line when energized by a current signal of the proper characteristic establishes a circumferential magnetic field thereabout which, with respect to the two superposed film elements, may be considered to be analogous to a longitudinal drive field $H_l$. As in the above discussed prior art, the polarity of the current signal coupled to the bit-sense line establishes the flux in the two superposed film elements in a first or a second and opposite polarity around their closed-flux-paths.

The coincident application of the energizing current signals to the word line and to the common bit-sense line or the individual application of the proper energizing signal to the common bit-sense line is able to establish the flux in the two film elements in the desired polarity. Additionally, by the coupling of an appropriate energizing current signal to the sandwiched word line the magnetization of the superposed film elements is rotated inducing a bipolar output signal in the common bit sense line, the polarity phase of which is indicative of the polarity of the film elements' magnetization. By providing two thick-ferromagnetic-film elements of appreciable thickness, i.e., in the order of 0.0001 inch, separated by a sandwiched word line, the separation of the two thick-ferromagnetic-film elements is sufficient to establish radial demagnetizing fields in such thick film elements. These radial demagnetizing fields preclude the magnetization of such films from becoming "locked-up" in the radial state. By using thick-ferromagnetic-film elements of sufficient thickness the memory element of the present invention is capable of inducing an output signal in the common bit-sense line of one volt.

BRIEF DISCUSSION OF THE DRAWINGS

DESCRIPTION OF THE PREFERRED EMBODIMENT

Figure 1:
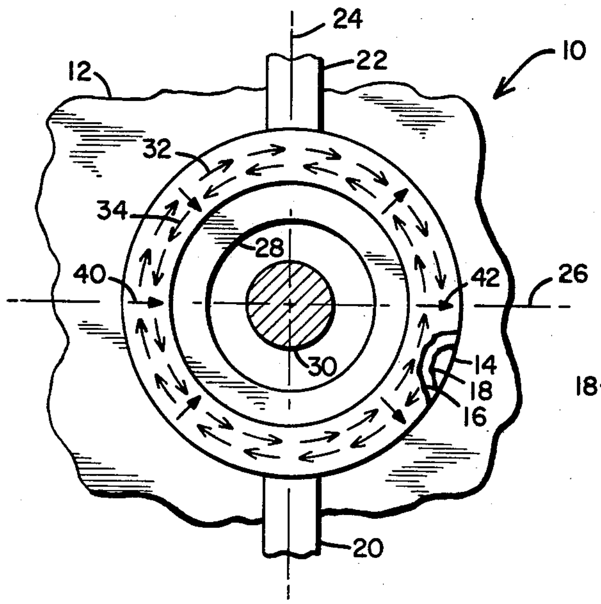
FIG. 1 is a plan view of a memory element incorporating the present invention.

With particular reference to FIG. 1 there is presented a plan view of a memory element 10 incorporating the present invention. Memory element 10 includes at least two superposed closed-flux-path thick-ferromagnetic-films 14 and 16 sandwiching therebetween a word line 18 of the same general planar form having radially opposing input and output leads 20 and 22. For purposes of aiding the description of the orientation of the various portions of memory element 10 there are illustrated two orthogonal axes 24 and 26 about which the elements of memory element 10 are symmetrically oriented.

In this arrangement film layers 14 and 16 and the enveloped word line 18 are symmetrically located about aperture 28 in substrate 12 through which the to-be-discussed common bit-sense line 30 is passed. Film layers 14, 16 form two closed-flux-paths for longitudinal drive fields $H_1$ of a first or of a second and opposite polarity identified by arrows 32 and 34. Arrows 32 and 34 illustratively represent the polarization of the magnetization M of layers 14 and 16 in the closed-flux-path formed thereby when the magnetization of such layers is effected by an energized bit-sense line 30 of a first or a second and opposite polarity for establishing the magnetization in such layers in a clock-wise or counter-clockwise direction thereabout. Additionally, layers 14 and 16 close a portion of the otherwise open flux-path about the enveloped word line 18.

Word line 18 when energized by an appropriate current signal establishes a radial, with respect to the intersection of axes 24, 26, magnetic field in the areas occupied by film layers 14 and 16 whereby there is provided in such film layers a transverse drive field $H_t$ that is generally orthogonal to the magnetization M, established by the energized bit-sense line, represented by arrows 32, 34. This transverse drive field $H_t$ effects the static magnetic field in the area of bit-sense line 30 established by the magnetization M in layers 14 and 16 represented by arrows 32, 34 for inducing in bit-sense line 30 a bipolar output signal the polarity phase of which is indicative of the informational state of memory element 10, i.e., whether the magnetization M of layers 14 and 16 are in a first magnetic polarization such as represented by arrows 32 or in a second and opposite magnetic polarization such as represented by arrows 34.

Element 10 may be formed by any one of the plurality of well-known methods of fabricating magnetizable memory elements; for discussion of some such methods see the copending patent applications of W. W. Davis, Ser. No. 254,913 filed Jan. 30, 1963 now Patent No. 3,276,000 and P. E. Oberg et al., Ser. No. 332,220, filed Dec. 20, 1963 now Patent No. 3,336,154, both assigned to the Sperry Rand Corporation as is the present invention. Additionally, element 10 may be fabricated in accordance with the S. M. Rubens Patent Nos. 2,900,282, 3,030,-612 and 3,155,561 in which the element may be formed in a continuous vapor deposition process. Additional methods may include the photo etching of such thick-ferromagnetic-film layers from Permalloy sheets of the desired thickness with the operatively associated electronic circuitry as disclosed in the V. J. Korkowski Patent No. 3,192,512 and the article "Permalloy-Sheet Transfluxor-Array Memory", G. R. Briggs et al., Journal of Applied Physics, Supplement to vol. 33, No. 3, March 1962, pp. 1065, 1066.

The thick-ferromagnetic-film layers 14 and 16 of the illustrated embodiment of FIG. 1 are generally formed not possessing the characteristic of unaxial anisotropy for providing an easy axis about which the magnetization M of layers 14 and 16 aligns itself in a first or second and opposite direction. The thick-ferromagnetic-films of the present invention, being in the order of 0.0001 inch, behave more or less isotropically as such thick-ferromagnetic-films are able to support magnetic domain walls parallel to their large planar surface. However, as with all closed-flux-path elements, layers 14 and 16 do exhibit and easy axis in their closed direction which easy axis may be described as shape anisotropy. The thickness of the copper word line 18 sandwiched by layers 14 and 16, along with any other insulating layers therebetween, must be of sufficient thickness to permit films 14 and 16 to exhibit some demagnetizing radial fields to prevent the flux in the two superposed layers 14 and 16 from becoming "locked-up" in the radial state.

Figure 2:
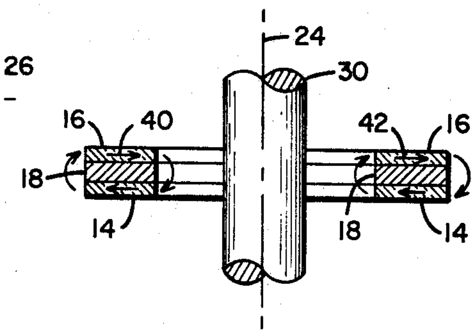
FIG. 2 is a cross-section of the memory element of FIG. 1 as taken along axis 26.

With particular reference to FIG. 2 there is presented a diagrammatic illustration of a cross-section of element 10 taken along axis 26 of FIG. 1 with substrate 12 and any necessary insulating members, such as silicon monoxide (SiO) layers electrically isolating layers 14, 16, and 18 being omitted for the sake of clarity. FIG. 2 is utilized to illustrate the approximate orientation of the elements of memory element 10 for purposes of clarifying the planar view of FIG. 1. Further, there is illustrated the vertically oriented bit-sense line 30 whose longitudinal axis is orthogonal to the planes of layers 14 and 16, and which passes centrally through aperture 28 of substrate 12 (not illustrated for the sake of clarity). Additionally, there are illustrated the nature of the transverse drive fields $H_t$ generated by an energized word line 18 showing the clockwise flow, in the illustrated example, of such fields in the left-hand and right-hand portions of memory element 10 along minor axis 26.

With reference again to FIG. 1 there is illustrated a plan view of memory element 10 that illustrates the general configuration of the paths of the magnetic flux generated by current signals flowing through word line 18 and bit-sense line 30. When a suitable current signal is coupled to line 30 there is established a magnetic field, represented by arrows 32 or 34, flowing in a circumferential direction thereabout, the polarity of which is determined by the polarity of the energizing current signal. This circumferential field about line 30 seeks a path of low reluctance, and, accordingly, concentrates in the paths presented by layers 14 and 16. Further, with a suitable current signal coupled to word line 18 there is established in the area of film layers 14 and 16 a magnetic field, radial with respect to the juncture of axes 24 and 26, represented by arrows 40 and 42. As stated above, the magnetic fields represented by arrows 32 and 34 may be considered to be longitudinal drive fields $H_l$ while the magnetic fields represented by arrows 40 and 42 may be considered to be transverse fields $H_t$. This longitudinal drive field $H_l$ is oriented parallel to the closed-flux-paths of layers 14 and 16 and tends to cause the magnetization of areas 14 and 16 to become aligned with the closed-flux-path thereof. With the magnetic fields schematically illustrated by arrows 32, 34 and 40, 42 established by suitable current signals flowing through line 30 and line 18 there are provided two magnetic fields orthogonal to each other in the area of layers 14 and 16 that are vectorially additive such that by the proper selection of the relative field intensities the magnetization M of layers 14 and 16 may be established in any one of a plurality of previously determined magnetic states in the rotational mode as disclosed in the S. M. Rubens et al. Patent No. 3,030,612.

Figure 3:
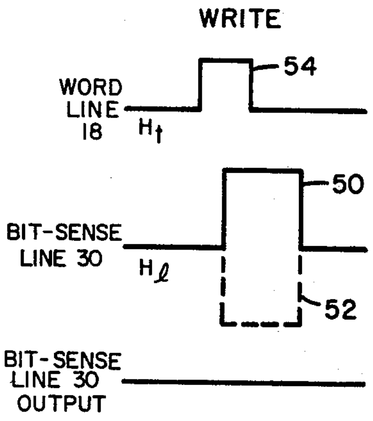
FIG. 3 is an illustration of the waveforms of the current signals utilized to accomplish the writing operation of the memory element of FIG. 1.

With particular reference to FIG. 3 there are illustrated the waveforms of the current signals utilized to accomplish the writing operation of element 10. In an arrangement utilizing a single memory element 10 a single write current signal 50, or 52, may be coupled to bit-sense line 30 for establishing the magnetization of film layers 14, 16 in a clockwise, or counterclockwise, polarization as illustrated by arrows 32, or 34. In this mode of operation writing pulses 50, or 52, must be of a sufficient intensity to provide a magnetic field in the area of film layers 14, 16 to be substantially greater than the coercivity, $H_c$, of such layers whereby the magnetization in such layers may be completely reversed in their polarization, such as switched from a clockwise to a counter-clockwise orientation as illustrated by arrows 32, or 34.

In a matrix array utilizing a plurality of memory elements 10 such as will be discussed below with reference to FIG. 6 it is necessary that a technique be utilized whereby at least one of the selection current signals, $H_l$, is incapable of substantially effecting the magnetization of layers 14, 16. In contrast, the coincident application of the two selection current signals, $H_l+H_t$, is capable of establishing the magnetization of layers 14, 16 in the proper magnetic polarization as determined by the polarity of at least one of the signals, such as $H_l$ signal 50 or 52 coupled to the bit-sense line 30, and by the magnitude of the other providing the $H_t$ field, such as signal 54. In this mode of operation the intensity of the $H_l$ field is limited whereby said field is incapable of achieving any substantial irreversible switching in film layers 14, 16. In this mode of operation a write current signal 54 is coupled to word line 18 for establishing a transverse drive field $H_t$ in the area of layers 14, 16 such as illustrated by arrows 40, 42 of FIG. 2. This transverse drive field $H_t$ establishes a radial field in layers 14, 16 forming a flux path through the superposed layers 14 and 16 about word line 18 as illustrated in FIG. 2. This transverse drive field $H_t$ is below the irreversible switching limit of the magnetization of layers 14, 16 such that substantially no irreversible switching is achieved thereby. A longitudinal write current signal 50, or 52, depending upon the desired polarization of the magnetization of layers 14, 16 that is to be established therein, and a conjointly applied transverse drive field not necessarily equal to the field 54 used for reading is coupled to the layers 14 and 16 by line 30 establishing a circumferential field about line 30 providing a circumferential field in layers 14, 16 as illustrated by arrows 32, or 34. The intensity of this applied longitudinal drive field $H_l$, as represented by pulses 50, or 52, is below the coercive force, $H_c$, of the magnetization of layers 14, 16 whereby it individually is incapable of achieving any irreversible magnetic switching of the magnetization of such layers. The conjoint action of the transverse drive field $H_t$, such as pulse 54, and the longitudinal drive field $H_l$, such as represented by pulse 50 or pulse 52, is sufficient to switch the magnetization of layers 14, 16 in the desired magnetic polarization direction about their closed-flux-paths upon release of the transverse drive field, as determined by the polarity of the applied longitudinal drive field $H_l$. This switching mechanism may be similar to that described in the S. M. Rubens et al. Patent No. 3,030,612.

Figure 4:
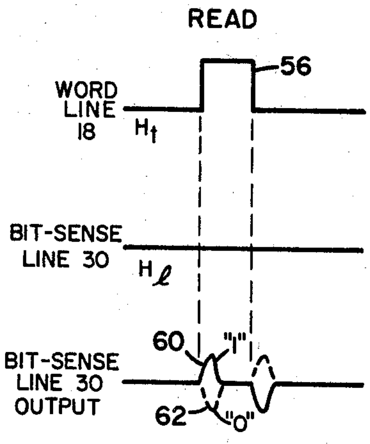
FIG. 4 is an illustration of the wave form of the current signal utilized to accomplish the reading operation of the memory element of FIG. 1.

With particular reference to FIG. 4 there are illustrated the signal waveforms associated with the reading operation of element 10. The readout operation is accomplished by the coupling of an appropriate current signal 56 to word line 18 thus generating in the area of film layers 14, 16 a transverse drive field $H_t$ that is below the irreversible switching limit of the magnetization of film layers 14, 16. The coupling of a read drive field 56 of this characteristic to word line 18 generates transverse drive fields $H_t$ acting radially in layers 14 and 16 as illustrated by arrows 40 and 42 of FIG. 1 and in a circumferential direction about the superposed portions of layers 14 and 16 as illustrated in FIG. 2. This transverse drive field 56, being below the irreversible switching limit of the magnetization of layers 14 and 16, only momentarily rotates the magnetization in such layers out of alignment with the anisotropic axis created by the closed-flux-path of such layers. This temporary rotation of the magnetizations of layers 14 and 16 out of alignment with their anisotropic axes and their return thereto upon the termination of transverse drive field $H_t$ as represented by pulse 56 induces a bipolar output signal 60 or 62 in sense line 30, the polarity phase of which is indicative of a "1" or a "0," such as represented by arrows 32 or 34, having been the informational state of memory element 10 as determined by the previous write operation.

Figure 5:
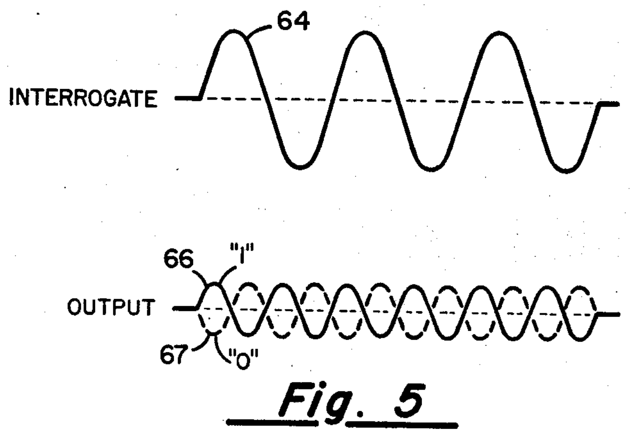
FIG. 5 is an illustration of the sine wave interrogate and output signal waveforms that may be utilized by the memory element of FIG. 1.

With particular reference to FIG. 5 there is illustrated an additional mode of readout operation that may be utilized with memory element 10. In this mode of operation a sine wave $H_t$ read signal 64 of frequency F with a maximum amplitude that is below the irreversible switching limit of the magnetization of film layers 14 and 16 is coupled to word line 18 much in the same nature as discussed above. However, due to the nature of the magnetic material of layers 14 and 16 there is induced in line 30 a sine wave output signal 66, 67 of a frequency 2F. By coupling the output ends of line 30 into a high Q tuned circuit a large voltage signal may be recovered, the phase of which voltage signal indicates the polarity of the stored information. The memory element 10 may also be operated as a Parametron element, by driving line 30 with a sine wave signal of 2F and coupling the output ends of line 18 into a high-Q tuned circuit tuned to frequency F. Such parametric behavior is similar to that described in Patent No. 3,173,108.

Figure 6:
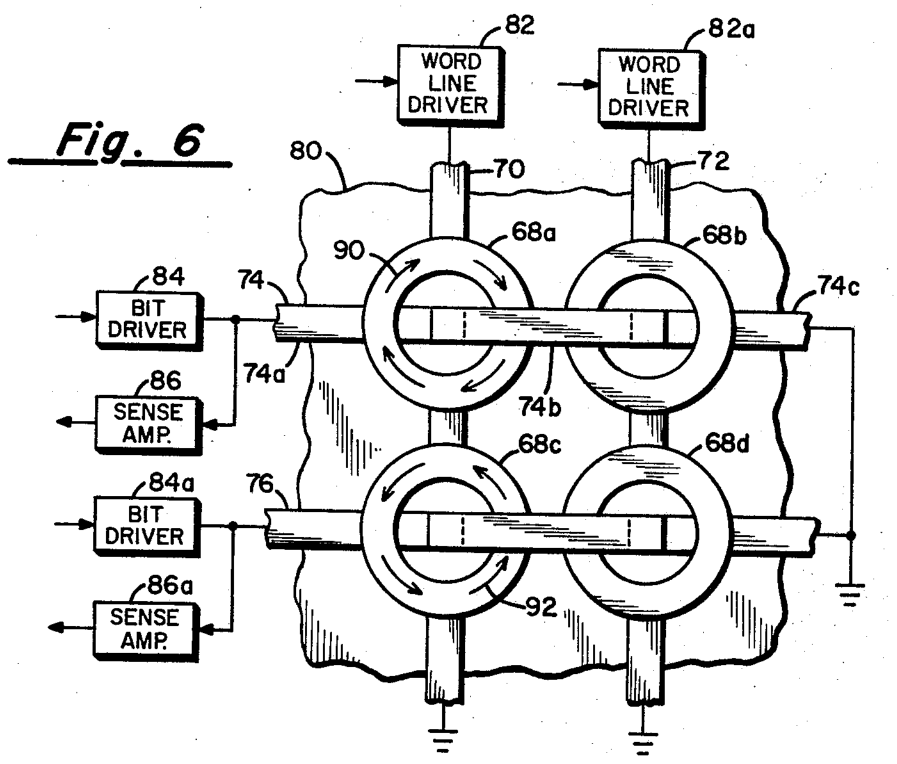
FIG. 6 is an illustration of another embodiment of the present invention.

With particular reference to FIG. 6 there is illustrated a memory system utilizing a plurality of memory elements 68 arranged in a two-dimensional planar array along parallel word lines 70 and 72 and parallel bit-sense lines 74 and 76. In this embodiment of the present invention the bit-sense lines 74 and 76 are not of a circular cross-section passing through an aperture centrally located within the magnetizable layers of each memory element 68. In this embodiment the bit-sense lines, such as bit-sense line 74, are formed of separate sections having overlapping portions in the area of the intersection of the major and minor axes thereof whereby there is provided a continuous electrical conductor passing through the central apertures of the aligned memory elements 68.

This embodiment may be fabricated by many of the above discussed methods whereby individual segments of the respective bit-sense lines such as segment 74$a$ and 74$c$ of bit-sense line 74 are initially laid down upon the substrate 80 with the memory elements 68$a$ and 68$b$ laid down upon these initial portions of bit-sense line 74 much in the same manner as in the embodiment of FIG. 1. Lastly, the interconnecting segments of the bit-sense line, such as segment 74$b$, are laid down upon the memory elements 68$a$ and 68$b$ for intercoupling the previously laid down segments 74$a$ and 74$c$ for providing a continuous electrical conductor such as bit-sense line 74. The laying down of rings of magnetizable material or conductive material may be accomplished by depositing discs and subsequently etching out the centers. In this case the segments 74$a$ and 74$c$ must be of a material that will resist the etchant, such as gold, with copper chloride as an etchant. Alternatively, rings may be deposited directly with a moving mask.

The reading and writing operation of the embodiment of FIG. 6 is as described in the operation previously discussed with respect to FIGS. 1 and 3. As an example of the above, assume that it is desirable to establish the magnetization of memory element 68$a$ in a clockwise polarity indicative of the writing of a "1" therein. Word line driver 82 is caused to couple a pulse 54 to word line 70 for causing to be established in the area of memory elements 68$a$ and 68$c$ a transverse drive field $H_t$. This transverse drive field $H_t$ established by pulse 54 flowing through word line 70 tends to rotate the magnetization of such memory elements in a radial direction as discussed above. This transverse drive field $H_t$ may be below the irreversible switching limit of both memory elements 68$a$ and 68$c$ effecting no substantial permanent change in the magnetization in memory elements 68$a$ and 68$c$. Subsequently, and conjointly therewith, bit driver 84 couples a pulse 52 to bit-sense line 74 establishing a longitudinal drive field $H_l$ in a circumferential direction thereabout as it passes through the central apertures of memory element 68$a$ and 68$b$. As before, with this longitudinal drive field $H_l$ establishing a magnetic field in the areas of memory elements 68$a$ and 68$b$ that is below the irreversible switching limit of the magnetization of such elements such longitudinal drive field individually is incapable of effecting a permanent change in the magnetization of such elements. However, at memory element 68$a$ the conjoint action of the transverse drive field $H_t$ established by the coupling of pulse 54 to word line 70 and the longitudinal drive field $H_l$ established by the coupling of pulse 52 to bit-sense line 74 conjointly provide vectorially additive transverse and longitudinal drive fields $H_t$ and $H_l$ the vector sum of which exceeds the irreversible switching threshold of the magnetization of memory element 68$a$ such that the magnetization of memory element 68$a$ is set into the clockwise direction as indicated by arrows 90 of FIG. 6. It should be observed that if the transverse drive field $H_t$ is below the irreversible switching limit of both memory elements, then element 68$c$ is left undisturbed by the writing of element 68$a$.

It is apparent in the above discussion that both memory elements 68$a$ and 68$c$ may undergo simultaneous writing operations in the well known manner. If for example, it is desirable that the magnetization of memory element 68$c$ be set into a counterclockwise polarization indicative of the writing of a "0" therein it is merely necessary that bit driver 84$a$, simultaneously with the coupling of pulse 54 to word line 70 by word line driver 82, couple pulse 50 to its associated bit-sense line 76. The conjoint action of the established longitudinal and transverse drive fields in the area of memory element 68$c$, as with memory element 68$a$, exceeds its irreversible switching threshold switching the magnetization of memory element 68$c$ into a counterclockwise direction as exemplified by arrows 92. In this writing mode, the transverse drive field $H_t$ may exceed the irreversible switching limit since all elements associated with the energized word lines are rewritten.

Readout of the information stored in memory element 68$a$ and 68$c$ associated with word line 70 is in the well known word-organized manner. In the word-organized readout operation, word line driver 82 couples read pulse 56 to its associated word line 70 whereby there are established in memory elements 68$a$ and 68$c$ transverse drive fields $H_t$ that induce in the associated bit-sense lines 74 and 76 bipolar output signals 60 and 62 respectively, as in FIG. 4.

Thus it is apparent that there has been described and illustrated herein the preferred embodiment of the present invention that provides a novel memory element. It is understood that suitable modifications may be made in the structure as disclosed provided that such modifications come within the spirit and scope of the appended claims. Having now fully illustrated and described our invention, what we claim to be new and desire to protect by Letters Patent is defined by the appended claims.

What is claimed is:

1. A nondestructive readout memory element, comprising:

two, planar, thick-ferromagnetic-films of substantially similar planar outlines, each film having at least one aperture therethrough for forming a longitudinal, closed-flux-path thereabout, said films superposed for forming a transverse, otherwise open-flux-path for each other film;

a first planar conductive member having a planar outline that is substantially similar to that of said films and sandwiched therebetween;

said films being sufficiently separated for causing said films to exhibit sufficient demagnetizing fields at their superposed edges to prevent the magnetization of said films from being locked-up in a direction that is in said transverse, otherwise open-flux-path.

2. The memory element of claim 1 wherein each of said films is of a sufficient thickness to support at least one magnetic domain wall parallel to the large surface thereof.

3. The memory element of claim 2 wherein said films and said first conductive member are of a substantially toroidal planar outline with said first conductive member having input and output leads that are arranged substantially on a diameter thereof.

4. The memory element of claim 2 further including a second conductive member threading said apertures.

5. The memory element of claim 4 further including a first driver means for coupling a first or a second and opposite polarity current signal to said second conductive member for generating first or second and opposite polarity longitudinal drive fields, respectively, for setting the magnetization of said films in a corresponding first or second and opposite polarity around said closed-flux-paths.

6. The memory element of claim 5 further including a second driver means for coupling a third current signal to said first conductive member for generating magnetic fields in said films that are substantially orthogonal to said longitudinal drive fields for forming transverse drive fields that are anti-parallel each other in superposed portions of said films.

7. The memory element of claim 6 wherein said first current signal induces an output signal in said second conductive member, the polarity phase of which is indicative of the polarity of the magnetization in said closed-flux-paths.

References Cited

UNITED STATES PATENTS

| | | | |
|---|---|---|---|
| 3,371,327 | 2/1968 | Anderson et al. | 340—174 |
| 3,378,821 | 4/1968 | Leilich | 340—174 |

BERNARD KONICK, Primary Examiner

KENNETH E. KROSIN, Assistant Examiner